United States Patent [19]
Ciokajlo et al.

[11] Patent Number: 5,349,814
[45] Date of Patent: Sep. 27, 1994

[54] AIR-START ASSEMBLY AND METHOD

[75] Inventors: John J. Ciokajlo; Michael T. O'Brien, both of Cincinnati, Ohio

[73] Assignee: General Electric Company, Cincinnati, Ohio

[21] Appl. No.: 12,664

[22] Filed: Feb. 3, 1993

[51] Int. Cl.[5] .............................................. F02C 7/262
[52] U.S. Cl. .................................. 60/226.1; 60/39.142
[58] Field of Search ............. 60/39.091, 39.142, 226.1, 60/39.163

[56] References Cited

U.S. PATENT DOCUMENTS

| | | | |
|---|---|---|---|
| 2,842,937 | 7/1958 | Clark | 60/39.14 |
| 2,952,973 | 9/1960 | Hall et al. | |
| 3,485,041 | 12/1969 | Evans | 60/39.14 |
| 3,989,848 | 6/1961 | Paiement | 60/39.14 |
| 4,062,185 | 12/1977 | Snow | 60/204 |
| 4,062,186 | 12/1977 | Snow et al. | 60/226 R |
| 4,430,575 | 2/1984 | Quigg | 290/52 |
| 4,461,143 | 7/1984 | Shutt | 60/39.142 |
| 4,799,354 | 1/1989 | Midgley | 60/39.142 |
| 4,885,909 | 12/1989 | Rodgers | 60/39.02 |
| 5,172,543 | 12/1992 | White | 60/39.142 |

FOREIGN PATENT DOCUMENTS

| | | | |
|---|---|---|---|
| 988817 | 4/1965 | United Kingdom | 60/39.142 |

OTHER PUBLICATIONS

Traeger, "Aircraft Gas Turbine Engine Technology," 1979, pp: i, ii, 499–502.
General Electric Company, "Engine Familiarization Course Notes," Mar. 1986, pp: cover, i, and 172.
Taylor, "Starter-Engine Interface Concepts," Paper No. 841548, Garrett Pneumatic Systems Div. of the Garrett Corp., undated, pp: 55–60.

*Primary Examiner*—Richard A. Bertsch
*Assistant Examiner*—William J. Wicker
*Attorney, Agent, or Firm*—Jerome C. Squillaro; Nathan D. Herkamp

[57] ABSTRACT

A method and assembly are effective for air-starting an aircraft gas turbine engine having a fan powered by a low pressure turbine through a first shaft, and a compressor powered by a high pressure turbine through a second shaft disposed coaxially therewith. A gear train is selectively operatively joined between the first and second shafts by selectively engaging a first clutch for transmitting torque through the first clutch only in one direction from the first shaft to the second shaft when the fan is windmilling for driving the second shaft to allow an air-start of the gas turbine engine during flight. In a preferred embodiment, a second clutch is operatively joined to the gear train and is selectively engageable at speeds of the second shaft below a predetermined release speed, and disengageable at the release speed and above for disconnecting the air-start assembly once the engine has been started.

7 Claims, 5 Drawing Sheets

AIR-START ASSEMBLY AND METHOD

The present invention relates generally to aircraft gas turbine engines, and, more specifically, to an assembly and method for air starting the engine during aircraft flight.

BACKGROUND OF THE INVENTION

Wide body commerical aircraft utilize turbofan gas turbine engines for powering the aircraft in flight. The turbofan engines includes a fan powered by a low pressure turbine (LPT) through a low pressure (LP) shaft, and a coaxial compressor powered by a high pressure turbine (HPT) through a high pressure (HP) shaft. The fan and LP shaft have a maximum rotational speed which is substantially less than the maximum rotational speed of the HP shaft for improving propulsion efficiency of the fan in powering the aircraft in flight.

In order to start the engine, a conventional air-driven starter is selectively operatively joined to the HP shaft through a suitable gearbox and is effective for rotating the HP shaft to a suitable speed of about 17% maximum RPM, so that the compressor can provide suitable compressed air to the combustor, which is then mixed with fuel and ignited for generating the combustion gases which power both the HPT and the LPT. The air starter is then suitably disconnected from the HP shaft once the engine is started and both the compressor and fan are being powered by the HPT and the LPT, respectively.

As aircraft turbofan engines become ever larger for producing higher levels of thrust, the compressor and HPT become larger and have larger rotational inertia which must be overcome by the starter for suitably rotating the HP shaft in order to start the engine. Accordingly, a correspondingly larger starter may be used to accelerate the HP shaft during start-up within an acceptable time interval, but, this increases installed weight of the engine in the aircraft and requires a suitably larger auxiliary power unit (APU) to drive the starter.

Furthermore, in the event engine restarting is required during flight of the aircraft, the time interval required to effect engine starting becomes more important and should be as small as possible for obtaining prompt engine start. Prompt air starting is also desirable without the need for increasing the size of the conventional starter or APU.

SUMMARY OF THE INVENTION

A method and assembly are effective for air-starting an aircraft gas turbine engine having a fan powered by a low pressure turbine through a first shaft, and a compressor powered by a high pressure turbine through a second shaft disposed coaxially therewith. A gear train is selectively operatively joined between the first and second shafts by selectively engaging a first clutch for transmitting torque through the first clutch only in one direction from the first shaft to the second shaft when the fan is windmilling for driving the second shaft to allow an air-start of the gas turbine engine during flight. In a preferred embodiment, a second clutch is operatively joined to the gear train and is selectively engageable at speeds of the second shaft below a predetermined release speed, and disengageable at the release speed and above for disconnecting the air-start assembly once the engine has been started.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENTS(S)

Figure 1:
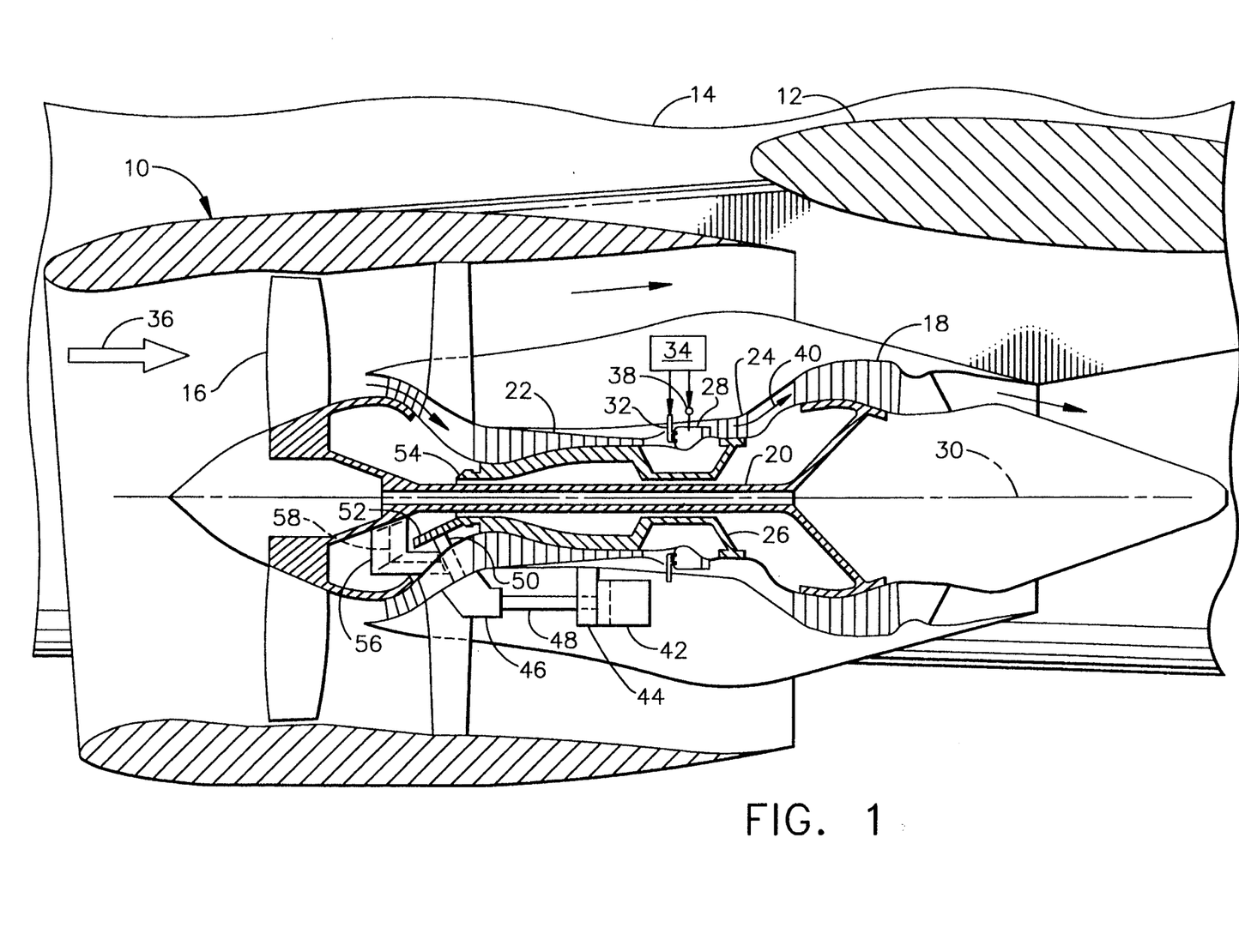
FIG. 1 is a schematic, partly sectional view of an aircraft mounted turbofan gas turbine engine having an air-start assembly in accordance with one embodiment of the present invention.

Illustrated schematically in FIG. 1 is a turbofan gas turbine engine 10 conventionally mounted below a wing 12 of an aircraft 14, only a portion of which is shown. The engine 10 includes a conventional fan 16 having a plurality of circumferentially spaced apart fan blades powered by a conventional first, or low pressure turbine (LPT) 18 through a first, or low pressure (LP) shaft 20 extending therebetween. A conventional axial-flow compressor 22 is powered by a conventional second, or high pressure turbine (HPT) 24 through a second, or high pressure (HP) shaft 26 extending therebetween which is disposed coaxially around the first shaft 20. A conventional annular combustor 28 is disposed concentrically around the second shaft 26 and the first shaft 20, all coaxially about a longitudinal centerline axis 30 of the engine 10. The combustor 28 includes conventional fuel injectors 32 which selectively receive fuel from a conventional control unit 34.

The engine 10 receives ambient air 36 through the fan 16 with an outer portion of the air 36 providing thrust for powering the aircraft 14 in flight, and an inner portion of which is channeled to the compressor 22 wherein it is further compressed. The compressed air is then conventionally channeled to the combustor 28 wherein it is mixed with fuel from the injectors 32 and ignited by a conventional igniter 38 controlled by the control unit 34 for generating combustion gases 40 which flow in turn through the HPT 24 and the LPT 18 for powering the compressor 22 and the fan 16, respectively.

In order to conventionally start the engine on the ground or restart the engines 10 in the air, a conventional air-powered starter 42 is provided and receives compressed air from a conventional auxiliary power unit (APU) which is not shown. The starter 42 is joined to a conventional accessory gearbox 44 which is conventionally operatively joined to a transfer gearbox 46 through a suitable shaft 48. Extending from the transfer gearbox 46 is a conventional starter shaft 50, more commonly referred to as a power takeoff (PTO) shaft since it is used for both starting the engine and for receiving power to drive the accessory gear box 44 and the several conventional accessory component joined thereto (not shown). Disposed at the distal end of the starter shaft 50 is a conventional bevel gear 52 operatively joined in engagement with a conventional HP shaft gear 54 disposed at one end of the second shaft 26 and coaxially about the centerline axis 30.

In order to conventionally start the engine 10, the starter 42 is provided with compressed air for turning its turbine therein which in turn rotates the shaft 48 and the starter 50, with the beveled gear 52 rotating the HP shaft gear 54 to drive the second shaft 26 at a suitable RPM of about 17% of its maximum speed, for example. The compressor 22 then compresses the air 36 which is discharged into the combustor 28 and mixed with fuel from the injectors 32, ignited by the igniter 38 to generate the self-sustaining combustion gases 40.

The engine 10 illustrated in FIG. 1 is representative of variously sized turbofan engines including relatively large engines wherein the compressor 22, HPT 24, and the second shaft 26 have a relatively high rotational inertia which must be suitably overcome for accelerating the second shaft 20 to a suitable speed for starting the engine.

In order to assist or supplant the conventional starter 42, an air-start assist assembly 56 in accordance with one embodiment of the invention is provided between the first shaft 20 and the second shaft 26, and is effective for starting the engine 10 solely during aircraft flight using power from the air 36 entering the fan 16.

More specifically, an improved method of air-starting the engine 10 includes the steps of:

windmilling the fan 16 to rotate the first shaft 20 joined thereto in the event of a flame-out of the combustor 28 which interrupts the generation of the combustion gases 40;

selectively joining the first shaft 20 to the second shaft 26 through a gear train 58 shown schematically in dashed line in FIG. 1, with the gear train 58 having a speed ratio greater than 1.0 for rotating the second shaft 26 by the windmilling of the fan 16;

starting the engine 10 by providing fuel through the fuel injectors 32 to mix with the compressed air provided by the compressor 22 into the combustor 28 and ignited by the igniter 38 for re-establishing the combustion gases 40; and disconnecting the first shaft 20 from the second shaft 26 after the engine 10 has been started.

In this way, energy from the windmilling fan 16 may be used temporarily during aircraft flight for rotating the second shaft 26 to start the engine 10. And, once the engine 10 has been started, the first and second shafts 20 and 26 are disconnected from each other for allowing normal operation of the engine 10 with the second shaft 26 rotating substantially faster than the first shaft 20. For example, the first shaft 20 has a maximum rotational speed of about 2,000 RPM, and the second shaft 26 has a maximum rotational speed of about 10,000 RPM. Although the air-start assembly 56 may be used for temporarily joining together the first and second shafts 20 and 26 for airstarting, the two shafts must be disconnected from each other for allowing normal operation of the engine 10 and independent rotation of the two shafts 20, 26 in a conventional manner.

Figure 2:
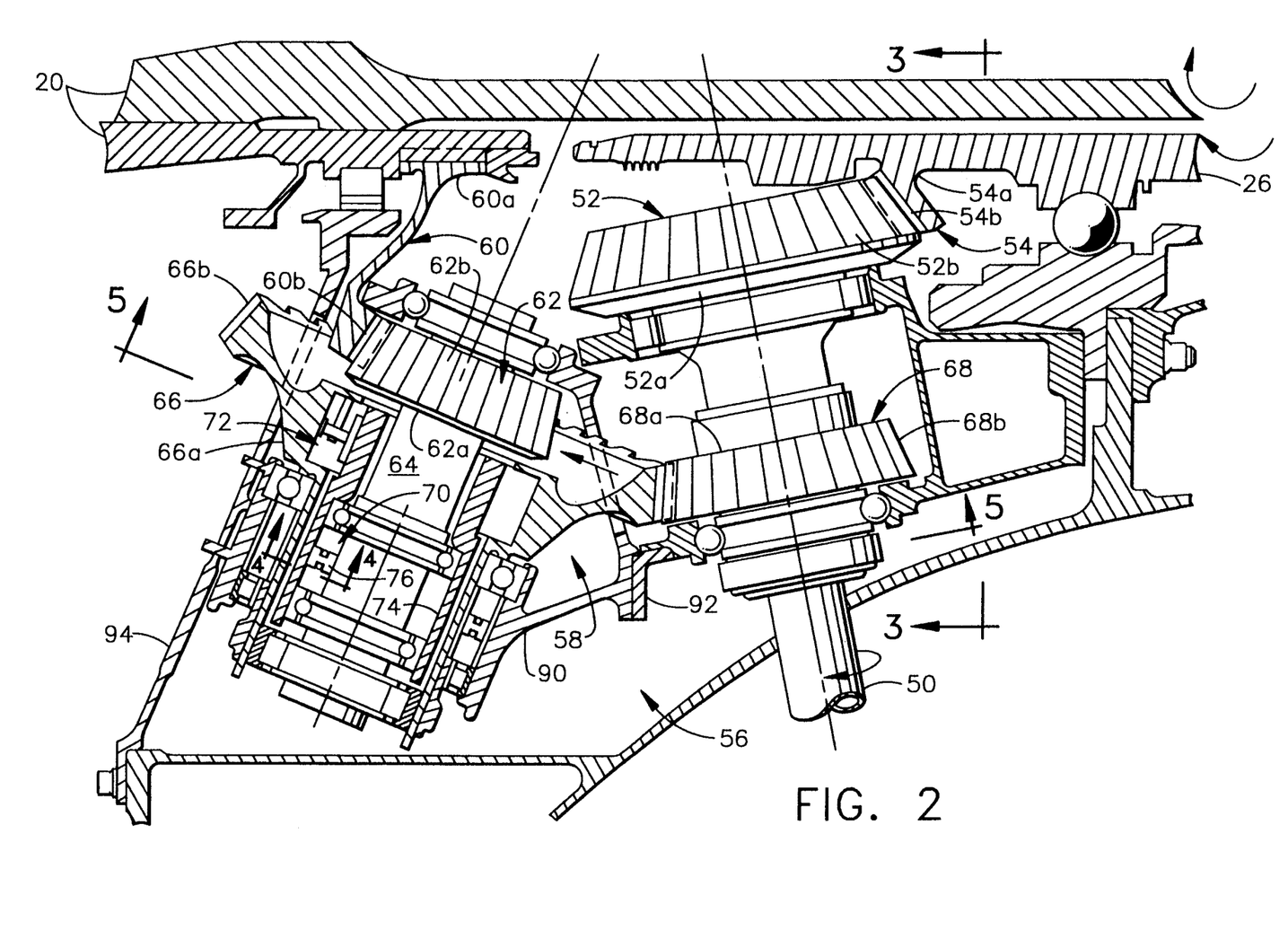
FIG. 2 is an axial, partly sectional view of the air-start assembly illustrated in FIG. 1 disposed between the low pressure and high pressure shafts of the engine in accordance with one embodiment of the present invention.

The air-start assembly 56 in accordance with a preferred and exemplary embodiment is illustrated in more particularity in FIG. 2. The gear train 58 may take any suitable configuration for providing a suitable speed increasing speed ratio greater than 1.0 from the first shaft 20 to the second shaft 26 for effective air starting. For example, in a flame-out condition of the engine 10 in flight, both the first and second shafts 20 and 26 will decelerate to relatively low rotational speeds. However, the fan 16, as shown in FIG. 1, will be caused to windmill by the air 36 channeled therethrough due to the forward movement of the aircraft 14. The windmilling fan 16 will reach a minimum rotational speed of about 17%, for example, of its maximum speed which may be about 400 RPM. The second shaft 26 in an exemplary embodiment must be rotated to about 20% of its maximum speed, or about 2,000 RPM in this example. Accordingly, the required gear speed ratio of the gear train 58 should be greater than about 2,000/400, or about 5:1 for suitably increasing the speed of the second shaft 26 by the windmilling rotation of the first shaft 20.

Figure 3:
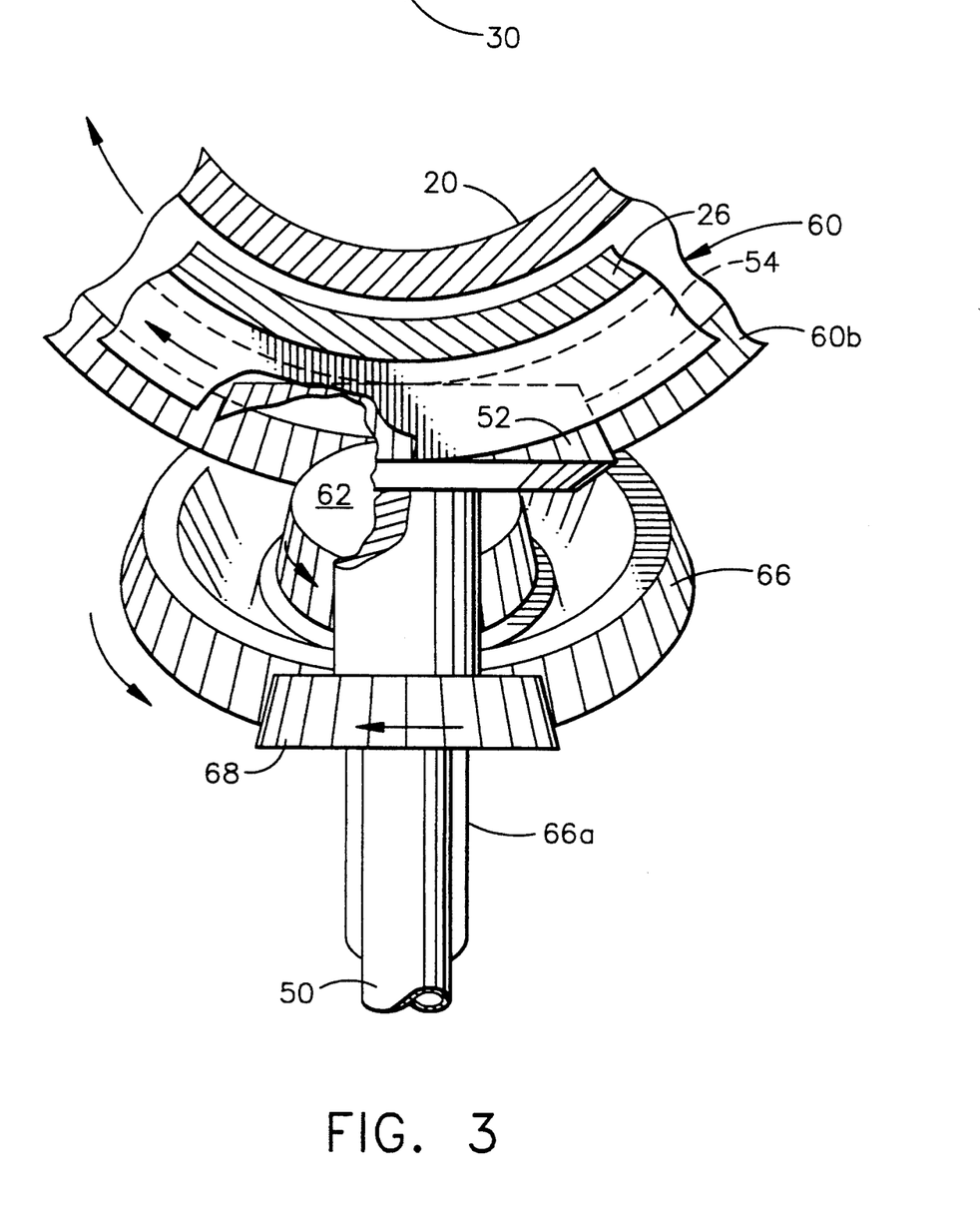
FIG. 3 is a partly sectional view of selected components of the air-start assembly illustrated in FIG. 2 taken generally along line 3—3.

In the exemplary embodiment illustrated in FIGS. 2 and 3, the gear train 58 includes a first gear 60 having a hub 60a operatively joined coaxially to the first shaft 20, and further has gear teeth 60b. In this exemplary embodiment, the first gear hub 60a is fixedly joined around the first shaft 20 through a conventional spline, for example, so that rotation of the first shaft 20 causes identical rotation of the first gear 60 about the centerline axis 30 (see FIG. 1). A second gear 62 in the conventional form of a bevel pinion gear similarly has a hub 62a operatively joined to an idle shaft 64 disposed obliquely to the first and second shafts 20, 26. The second gear 62 includes gear teeth 62b joined in an engagement with the first gear teeth 60b for transmitting torque therebetween.

The gear train 58 further includes in this exemplary embodiment a third gear 66 having a hub 66a operatively joined to the idle shaft 64, and further has gear teeth 66b. A fourth gear 68 in the form of a bevel pinion gear has a hub 68a operatively joined to the starter shaft 50, and further has gear teeth 68b joined in engagement with the third gear teeth 66b for transmitting torque therebetween.

The gear train 58 is, therefore, operatively joined to the conventional starter shaft 50 by the added fourth gear 68 joined thereto for in turn selectively rotating the bevel gear 52 and the HP shaft gear 54. The gears 52 and 54 are, accordingly, fifth and sixth gears, respectively, of the overall gear train 58 for providing a speed increase from the first shaft 20 to the second shaft 26.

In the exemplary embodiment illustrated in FIG. 2, the sixth gear 54 is disposed coaxially with the second shaft 26 about the centerline axis 30 (see FIG. 1) and includes a hub 54a operatively, or fixedly, joined to the second shaft 26 around its outer diameter, and further has gear teeth 54b joined in engagement with gear teeth 52b of the fifth gear 52. The fifth gear 52 has a hub 52a operatively, or fixedly, joined to the distal end of the starter shaft 50 for transmitting torque between the shaft 50 and the second shaft 26.

In order to allow normal operation of the engine 10 after it has been started, the gear train 58 is preferably selectively operatively joined between the first and second shafts 20 and 26 by a selectively engageable one-way first clutch 70 for transmitting torque through the first clutch 70 only in one direction from the first shaft 20 to the second shaft 26 when the fan 16 is windmilling for driving the second shaft 26 to allow an air-start of the engine 10 during flight. Furthermore, a second clutch 72 is preferably also operatively joined to the gear train 58 and is selectively engageable at speeds of the second shaft 26 below a predetermined release speed, and is disengageable at the release speed and above.

In this way, the gear train 58 is effective for transmitting torque solely in one direction from the first shaft 20 to the second shaft 26, and only during an air-start of the engine 10 wherein the speed of the second shaft 26 is relatively low. Once the engine 10 has been started and the speed of the second shaft 26 increases to its normal range, the second clutch 72 disengages to prevent unneeded rotation of gears within the gear train 58 which wastes energy and leads to unnecessary wear thereof. And, the first clutch 70 prevents transmission of torque backward through the gear train 58 from the second shaft 26 to the first shaft 20.

The first and second clutches 70 and 72 may be positioned in the gear train 58 at various locations for effective operation. In the exemplary embodiment illustrated in FIG. 2, the fourth gear 68 is fixedly joined to the starter shaft 50 at its hub 68a in a conventional manner by being formed integrally therewith, and the second clutch 72 is operatively joined between the idle shaft 64 and the third gear hub 66a for selectively allowing torque transmission from the idle shaft 64 through the second clutch 72 to the third gear 66, and in turn to the fourth gear 68, at speeds of the second shaft 26 below the predetermined release speed. The second clutch 72 is also effective for preventing torque transmission backwardly from the third gear 66 to the idle shaft 64 at and above the release speed. For example, the release speed may be about 20% of the maximum speed of the second shaft 26 selected to ensure suitable rotational speed of the second shaft 26 for rotating the compressor 22 for generating suitable compressed air for the combustor 28 for allowing ignition and initiation of the combustion gases 40.

The first clutch 70 is preferably operatively joined between the third gear 66 and the first shaft 20 for transmitting torque only from the first shaft 20 to the third gear 66 and preventing torque transmission from the third gear 66 to the first shaft 20. The first clutch 70 may be disposed at any suitable junction between the first shaft 20 and the third gear 66, and in the exemplary embodiment illustrated in FIG. 2 is operatively joined between the third gear 66 and the idle shaft 64.

Although the first and second clutches 70 and 72 may take any conventional form which are selectively engageable and operable as above described, in the preferred embodiment illustrated in FIG. 2 the first clutch 70 is a conventional sprag clutch and the second clutch 72 is a conventional centrifugal clutch joined to a common tubular clutch shaft 74 for providing a compact overall arrangement of the gear train 58 and the clutches 70, 72. The clutch shaft 74 is disposed coaxially between the idle shaft 64 and the third gear hub 66a which is also tubular and generally coextensive therewith. The first clutch 70 is operatively joined radially between the outer circumference of the idle shaft 64 and the inner circumference of the clutch shaft 74. And the second clutch 72 is operatively joined radially between the outer circumference of the clutch shaft 74 and the inner circumference of the third gear hub 66a.

Figure 4:
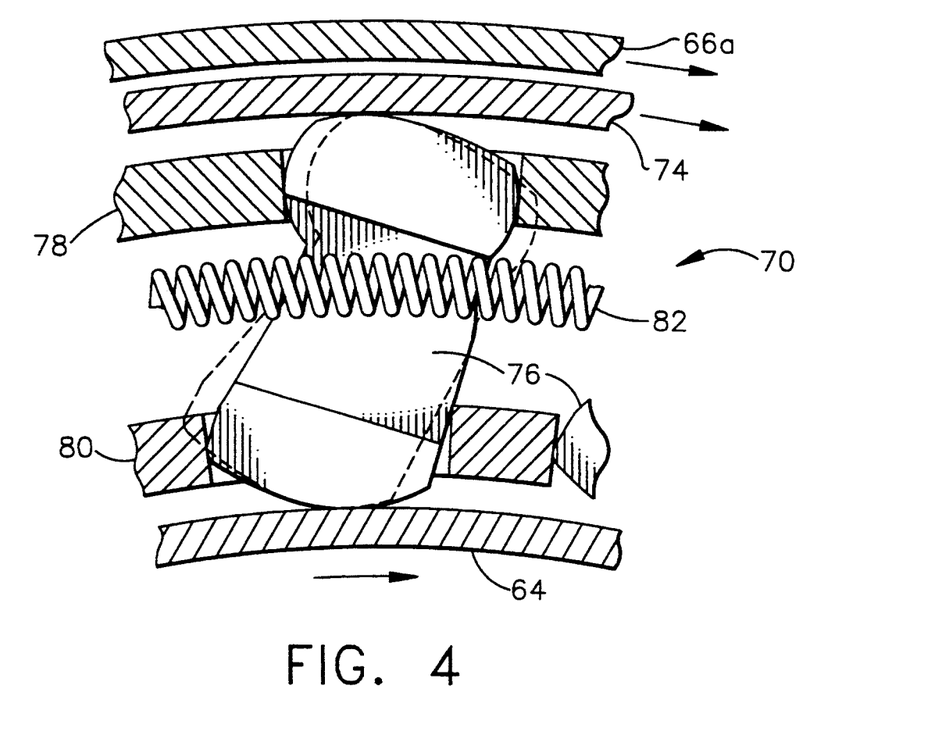
FIG. 4 is a partly sectional view through selected components of the air-start assembly illustrated in FIG. 2 including a centrifugal clutch therein and taken along line 4—4.

FIG. 4 illustrates in more particularity a portion of the first or sprag clutch 70 which is conventional in configuration and operation. The sprag clutch 70 includes a plurality of circumferentially spaced apart and pivotable sprags or dogs 76 extending radially between the outer circumference of the idle shaft 64 and the inner circumference of the clutch shaft 74. The sprags 76 are conventionally loosely mounted in tubular, radially outer and inner cages 78, 80 and are sandwiched axially between a pair of energizing springs 82 in conventional fashion. As shown in solid line in FIG. 4, during an air-start the idle shaft 64 is being rotated in the clockwise direction by the second gear 62 in turn from the first gear 60 joined to the first shaft 20 (see FIG. 2). This causes the sprags 76 to exert a wedge-like force between the idle shaft 64 and the clutch shaft 74 for transmitting torque in a clockwise direction from the idle shaft 64 to the clutch shaft 74. This torque transmission occurs solely with clockwise rotation of the idle shaft 64 relative to the clutch shaft 74 to ensure only one way transmission of torque from the first shaft 20 to the second shaft 26. In the event the clutch shaft 74 were to be caused to rotate clockwise relative to the idle shaft 64, the sprags 76 will be displaced to the position shown in dashed line in FIG. 4 which removes the wedge forces between the sprags 76 and the shafts 64, 74 and prevents backwards the transmission of torque from the clutch shaft 74 to the idle shaft 64.

Figure 5:
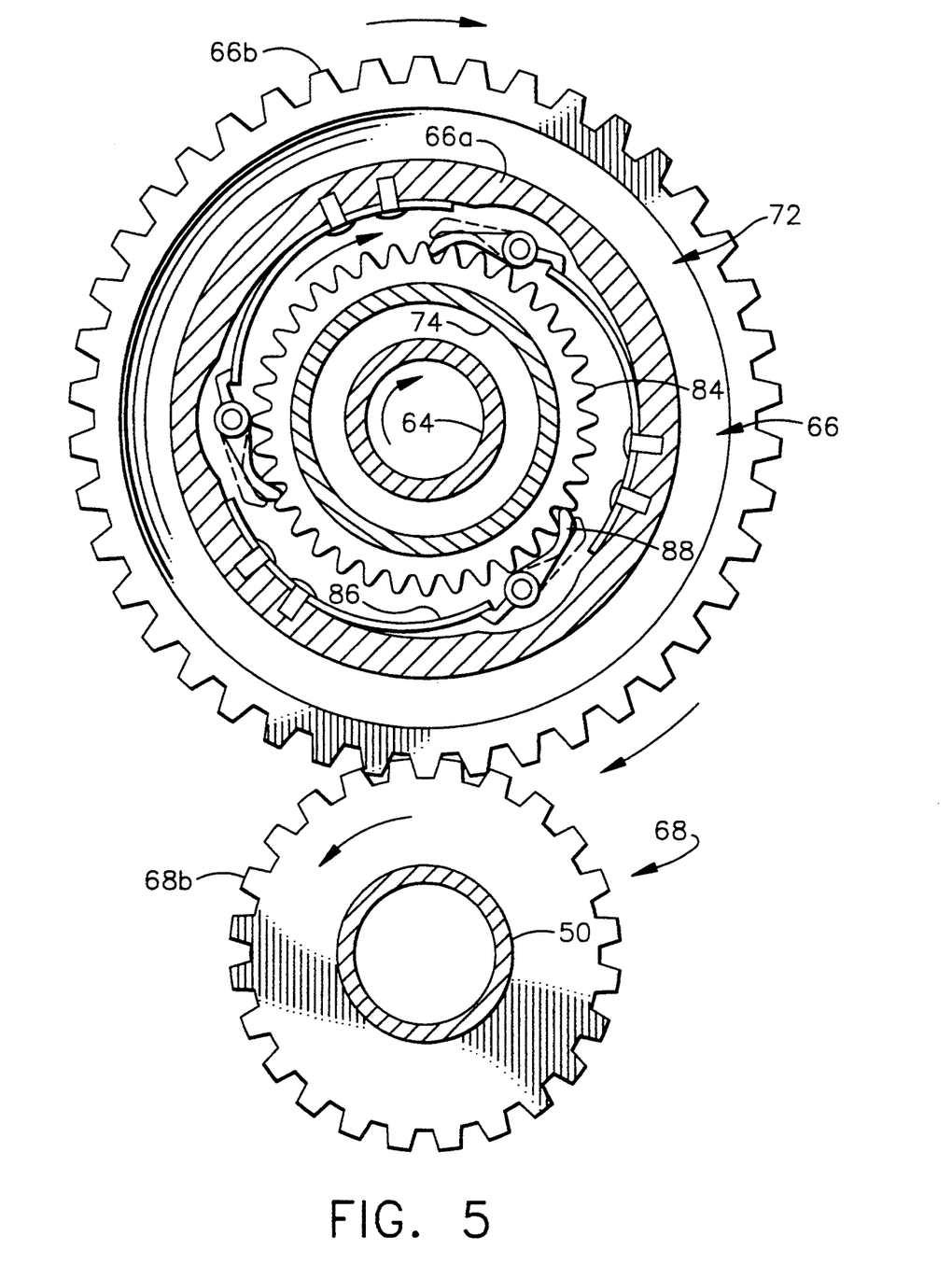
FIG. 5 is a partly sectional view of a portion of the air-start assembly illustrated in FIG. 2 taken along line 5—5 for showing a portion of a sprag clutch therein.

The second, or centrifugal clutch 72 is illustrated in more particularity in FIG. 5. The centrifugal clutch 72 is also conventional in structure and operation and includes a plurality of clutch teeth 84 extending radially outwardly from a portion of the clutch shaft 74. A plurality of circumferentially spaced apart leaf springs 86 extend radially inwardly from the third gear hub 66a, and have proximal ends suitably fixedly joined thereto by bolts or rivets, for example. A plurality of circumferentially spaced apart conventional dogs 88 are conventionally pivotally joined to a suitable sidewall of the third gear hub 66a between the leaf springs 86 and clutch teeth 84. The distal ends of the springs 86 contact the respective proximal ends of the dogs 88 for biasing the distal ends of the dogs 88 in engagement with the clutch teeth 84 for transmitting torque between the clutch shaft 74 and the third gear 66 at speeds below the release speed. As shown in FIG. 5, when the clutch shaft 74 rotates in the clockwise direction, the teeth 84 engage the distal ends of the dogs 88 which in turn transmits torque through the dogs 88 into the third gear hub 66a for rotating the third gear 66 also in the clockwise direction. The third gear teeth 66b then rotate the fourth gear 68 in a counterclockwise direction as shown in FIG. 5 which in turn rotates the starter shaft 50 for rotating the fifth gear 52 and in turn the sixth gear 54 and second shaft 26 as illustrated in FIG. 2. As the speed of the third gear 66 increases, centrifugal force acting on the distal ends of the dogs 88 causes the dogs 88 to rotate in a clockwise direction shown in dashed line in FIG. 5 against the biasing force of the springs 86 which compresses the springs 86 radially outwardly to release the dogs 88 from the clutch teeth 84 at and above the predetermined release speed. In this way, when the second shaft 26 is operating above the release speed, the dogs 88 will be disengaged from the clutch teeth 84 for disengaging the second clutch 72.

Accordingly, in a normal start of the engine 10 such as on the ground, the original air starter 42 will operate to rotate the starter shaft 50 for rotating the second shaft 26. The centrifugal clutch 72 will be engaged up to the release speed, but the sprag clutch 70 will slip and prevent reverse torque through the gear train 58 from rotating the first shaft 20, and in turn the fan 18. Once the engine 10 is started and both the first and second shafts 20 and 26 reach their normal operating speeds, the centrifugal clutch 72 will be disengaged by centrifugal force acting on the dogs 88, and the sprag clutch 70 will continue to slip so that no torque is transmitted from the first shaft 20 to the second shaft 26.

Under a normal engine shut-down, for example during flight, the second shaft 26 will coast down more quickly than the first shaft 20 causing the centrifugal clutch 72 to engage once the release speed is reached, which will have no effect since the sprag clutch 70 continues to slip and prevents reverse torque flow through the gear train 58 to the first shaft 20. However, once the speed of the clutch shaft 74 becomes less than or equal to about the speed of the idle shaft 64 during such coastdown, the sprags 76 will engage but only for transmitting torque from the idle shaft 64 to the clutch shaft 74 for air starting the engine 10 using the air-start assembly 56. The windmilling fan 16 will rotate the first gear 60 which in turn rotates the second gear 62 and idle shaft 64 for transmitting torque through the sprags 76 to the clutch shaft 74. The clutch shaft 74 will transmit torque through the dogs 88 to the third gear 66 and in turn to the fourth, fifth, and sixth gears 68, 52, and 54, respectively for rotating the second shaft 26 to allow the engine 10 to be air started.

As shown in FIGS. 2 and 3, the first gear 60 is a relatively large gear having the same center as the centerline axis 30, with the second gear 62 being substantially smaller compared thereto. This larger gear to small gear arrangement provides one speed increase ratio. The third gear 66 is also larger than the fourth gear 68 and provides another speed increase ratio. The conventionally sized fifth gear 52 is substantially smaller than the sixth gear 54 for providing a speed reduction. However, the speed increase from the first, second, third, and fourth gears 60, 62, 66, and 68 may be selected relative to the speed reduction of the fifth and sixth gears 52, 54 to provide an overall speed increase ratio substantially greater than 1.0, and about 5:1 in this exemplary embodiment since the second shaft 26 needs to be rotated at about five times the speed of the first shaft 20 when it is windmilling in flight. Of course, the particular speed ratios may be conventionally determined for each design application for providing effective air starting of the engine 10 when required.

By combining the air-start assist assembly 56 with the originally provided starter shaft 50 and bevel gear 52, the original air starter 42 may also be used during the air-start if desired. Accordingly, the additional energy provided by the air-start assembly 56 for starting the engine 10 during flight, allows the original air starter 42, and its APU, to remain relatively small for reducing weight and maintaining overall efficiency of the combination.

In an alternate embodiment for the invention, the first and second clutches 70 and 72 may be located at different locations between the first and second shafts 20, 26 and relative to the gears of the gear train 58 if desired. And, as shown in FIG. 2, the air-start assembly 56 includes a suitable stationary housing 90 from which the gears and shafts described above are conventionally mounted in roller and/or ball bearings. The housing 90 may be mounted to the original frame 92 supporting the starter shaft 50, or may be, alternatively, mounted to the conventional bearing cone 94 which supports the first shaft 20.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. An air-start assembly for an aircraft gas turbine engine having a fan powered by a low pressure turbine through a first shaft, and a compressor powered by a high pressure turbine through a second shaft disposed coaxially around said first shaft comprising:

a gear train selectively operatively joined between said first and second shafts by a selectively engageable first clutch for transmitting torque through said first clutch only in one direction from said first shaft to said second shaft when said fan is windmilling for driving said second shaft to allow an air-start of the gas turbine engipe during flight; and a second clutch operatively joined to said gear train and selectively engageable at speeds of said second shaft below a predetermined release speed, and disengageable at said release speed and above;

wherein said first clutch comprises a sprag clutch and said second clutch comprises a centrifugal clutch;

wherein said gear train has a speed ratio greater than 1.0 from said first shaft to said second shaft;

wherein said gear train comprises:

a first gear having a hub operatively joined coaxially to said first shaft, and further having gear teeth;

a second gear having a hub operatively joined to an idle shaft, and having teeth joined in engagement with said first gear teeth for transmitting torque therebetween;

a third gear having a hub operatively joined to said idle shaft, and further having gear teeth;

a fourth gear having a hub operatively joined to a starter shaft, and further having gear teeth joined in engagement with said third gear teeth;

a fifth gear having a hub operatively joined to said starter shaft, and further having gear teeth; and a sixth gear having a hub operatively joined to said second shaft, and further having gear teeth joined in engagement with said fifth gear teeth.

2. An air-start assembly for an aircraft gas turbine engine having a fan powered by a low pressure turbine through a first shaft, and a compressor powered by a high pressure turbine through a second shaft disposed coaxially around said first shaft comprising;

a gear train selectively operatively joined between said first and second shafts by a selectively engageable first clutch for transmitting torque through said first clutch only in one direction from said first shaft to said second when said fan is windmilling for driving said second shaft to allow an air-start of the gas turbine engine during flight; and a second clutch operatively joined to said gear train and selectively engageable at speeds of said second shaft below a predetermined release speed, and disengageable at said release speed and above;

wherein said gear train has a speed ratio greater than 1.0 from said first shaft to said second shaft;

wherein said gear train comprises;

a first gear having a hub operatively joined coaxially to said first shaft, and further having gear teeth;

a second gear having a hub operatively joined to an idle shaft and having teeth joined in engagement with said first gear teeth for transmitting torque therebetween;

a third gear having a hub operatively joined to said idle shaft, and further having gear teeth;

a fourth gear having a hub operatively joined to a starter shaft, and further having gear teeth joined in engagement with said third gear teeth;

a fifth gear having a hub operatively joined to said starter shaft, and further having gear teeth; and a sixth gear having a hub operatively joined to said second shaft, and further having gear teeth joined in engagement with said fifth gear teeth;

wherein said second clutch is operatively joined between said idle shaft and said third gear hub for selectively allowing torque transmission from said idle shaft through said second clutch to said third gear below said release speed of said second shaft, and for preventing torque transmission from said third gear to said idle shaft at and above said release speed.

3. An assembly according to claim 5 wherein said first clutch is operatively joined between said third gear and said first shaft for transmitting torque only from said first shaft to said third gear, and for preventing torque transmission from said third gear to said first shaft.

4. An assembly according to claim 3 wherein said first clutch is operatively joined between said third gear and said idle shaft.

5. An assembly according to claim 4 further including a tubular clutch shaft disposed coaxially between said idle shaft and said third gear hub; and wherein said first clutch is operatively joined between said idle shaft and said clutch shaft, and said second clutch is operatively joined between said clutch shaft and said third gear hub.

6. An assembly according to claim 5 wherein said first clutch is a sprag clutch having a plurality of circumferentially spaced apart pivotable sprags extending radially between said idle shaft and said clutch shaft.

7. An assembly according to claim 6 wherein said second clutch is a centrifugal clutch having:

a plurality of clutch teeth extending radially outwardly from said clutch shaft;

a plurality of springs extending radially inwardly from said third gear hub;

a plurality of circumferentially spaced apart dogs pivotally joined to said third gear hub and disposed between said springs and said clutch teeth; and said springs being configured to bias said dogs in engagement with said clutch teeth for transmitting torque between said clutch shaft and said third gear below said release speed, and being compressible by centrifugal force from said dogs to release said dogs from said clutch teeth at and above said release speed.

* * * * *